Patented Oct. 3, 1950

2,524,041

UNITED STATES PATENT OFFICE 2,524,041

TIPPY WOOL DYEING ASSISTANTS

Alton A. Cook, Glen Ridge, and Ira Sapers, Newark, N. J., assignors to Arkansas Company, Inc., Newark, N. J., a corporation of New York No Drawing. Application July 11, 1946, Serial No. 682,934

6 Claims. (Cl. 8—54)

The present invention relates to agents useful in dyeing procedures for tippy wools.

Tippy wool is a wool in which parts of the wool fiber have been damaged or subjected to such treatment that there is considerable variation in chemical nature of the wool and therefore its affinity for dyes. The dyeing of such wool presents a most difficult problem in obtaining uniform shades.

It is therefore among the objects of the present invention to provide improved dyeing assistants and dyeing procedures utilizing such assistants which are particularly applicable to obtain uniform dyeing effects upon tippy wool.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found that certain combinations of water soluble high molecular weight polyethylene glycol fatty esters with amino-fatty condensation products are remarkably effective. With the polyethylene glycol fatty esters may also be included some of the unesterified polyethylene glycol itself.

PREPARATION OF POLYETHYLENE GLYCOL FATTY ESTERS

The water soluble high molecular weight polyethylene glycol fatty esters are formed, in general, by heating a high molecular weight polyethylene glycol with a fatty acid at 110° to 130° C. in the presence of an acid catalyst for several hours. Polyethylene glycols of molecular weight from 400 to 6000 may be employed, but those having molecular weights of 1000 to 4000 are preferred. Fatty acids from 10 to 32 carbon atoms, both saturated and unsaturated may be used, but fatty acids from 12 to 18 carbon atoms are preferred. The fatty acids employed may be the commercial products, or, they may be the mixed acids derived from the splitting of natural fats and oils such as tallow, palm oil, cocoanut oil, japan wax and castor oil.

Of the catalysts found most suitable are alkylated aromatic sulfonic acids, such as mono-butyl-alpha naphthalene sulfonic acid. Other sulfonic acids such as meta-naphthalene sulfonic acid and para toluene sulfonic acids may also be used. In some cases, tetra phosphoric acid and sulfuric acid may be used. In general, 0.5% to 1.0% of the catalyst based on the combined weight of the reactants is used.

In general, one mol or slightly in excess of one mol, of the high molecular weight polyethylene glycol and two mols of the fatty acid are heated at a temperature in the range of 110° to 130° C. for 4 to 8 hours or longer in the presence of an acid catalyst such as described above. In some cases a lower proportion of fatty acid, namely from 1 to 1½ mols per mole of polyethylene glycol may be used, but in general such products are not preferable. The reaction is usually continued until the free fatty acid content of the mixture is reduced to 5% or less. At this stage, the esterified product yields a brilliant clear solution in water. The following examples illustrate the actual manufacture of these esterified products:

Intermediate product #1

| | Parts by weight |
|---|---|
| A polyethylene glycol having a molecular weight of approximately 4000 | 4200 |
| Stearic acid | 568 |
| Para toluene sulfonic acid | ¾% on combined weights of components |
| Temperature | 115 to 125° C. |
| Time | 8 hours |

Intermediate product #2

| | Parts by weight |
|---|---|
| A polyethylene glycol having a molecular weight of approximately 1500 | 1580 |
| Palmitic acid | 512 |
| Beta naphthalene sulfonic acid | ½% on combined weights of components |
| Temperature | 120 to 130° C. |
| Time | 4 hours |

Intermediate product #3

| | Parts by weight |
|---|---|
| A polyethylene glycol having a molecular weight of approximately 1000 | 1020 |
| Cocoanut oil fatty acid | 420 |
| Mono butyl alpha napthalene sulfonic acid | 1.0% on combined weight of components |
| Temperature | 110 to 115° C. |
| Time | 6 hours |

Intermediate product #4

| | Parts by weight |
|---|---|
| A polyethylene glycol having a molecular weight of approximately 700 | 735 |
| Low titer oleic acid | 350 |
| Tetra phosphoric acid | 1% on combined weight of components. |
| Temperature | 115° to 120° C. |
| Time | 5 hours |

PREPARATION OF AMINO FATTY CONDENSATION PRODUCTS

The amino fatty condensation products are formed in general, by heating one mol of a water soluble aliphatic amine with one or two mols of a fatty acid, or its equivalent as a fatty glyceride or other fatty ester at 180° to 220° C. for 2 to 4 hours, or until the free fatty acid content of the mixture is 1% or less. Of the water soluble aliphatic amines, those having two or more amine groups are preferred and both hydroxylated and non-hydroxylated amines may be used.

In the preferred amines the number of carbon atoms in the amine may range from 2 to 18 carbon atoms and the amino or imino groups may range from 2 to 8. For example, aminoethylethanolamine, diethylenetriamine, triethylenetetramine, and tetraethylenepentamine have been found to give the most satisfactory products. Other amines such as mono-, di-, and tri-ethanolamines, and similar isopropanolamines may be used, but in general, do not give as satisfactory products. Fatty acids having from 10 to 32 carbon atoms, both saturated and unsaturated, may be used, but those having from 12 to 18 carbon atoms are preferred. The fatty acids employed may be the commercial products or may be the mixed acids derived from the splitting of natural fats and oils.

To illustrate the preparation of these condensation products, the following specific examples may be given:

Intermediate product #5

| | Parts by weight |
|---|---|
| Cocoanut fatty acids | 210 |
| Aminoethylethanolamine | 105 |

Intermediate product #6

| | Parts by weight |
|---|---|
| Stearic acid | 284 |
| Tetraethylenepentamine | 190 |

Intermediate product #7

| | Parts by weight |
|---|---|
| Oleic acid | 282 |
| Triethylenetetramine | 150 |

Intermediate product #8

| | Parts by weight |
|---|---|
| Cocoanut fatty acids | 420 |
| Tetraethylene pentamine | 200 |

In all of the above cases a temperature range of 180° to 220° C. is employed, and the time is usually 1 to 4 hours. These amino fatty condensation products are in general alkaline in character having a pH of about 10 as a 1% aqueous solution. With products #5, #6 and #7 one end amino group is condensed with the fatty acid, while with product #8 both end amino groups are condensed with the fatty acid.

DYEING ASSISTANT COMPOSITIONS

To produce the dyeing assistant compositions of the present invention, one or more of the esterified products and one or more of the amino fatty condensation products are mixed together in the desired proportions and heated at 100° to 150° C. for 15 minutes to 2 hours. A water soluble organic acid such as acetic, formic, or lactic is then added in such amount to give the aqueous solution a pH range of 6 to 7. With or after the addition of acid sufficient water may be added so that the combination has a water content of 10 to 90%.

These dyeing assistant compositions are used in the dye bath in the amount of ½ to 2% based upon the weight of the goods to be dyed. Such compounds produce a high degree of exhaustion of the dye bath with unusual leveling properties, particularly in the case of metalliferous dyes on wool and other animal fibres. In general, the preferred proportion is from 20 to 50 parts by weight of the water soluble high molecular weight polyethylene glycol fatty ester and 5 to 20 parts by weight of the fatty amino condensation products. In all cases, the latter component is preferred in lesser quantity than the former component. To illustrate compositions which have been used successfully in dyeing under the conditions described above, we give the following examples.

Combination product A

| | Parts by weight |
|---|---|
| Intermediate product #2 | 30 |
| Intermediate product #5 | 20 |

Formic acid is added to this mixture in sufficient quantity so that an aqueous solution of the product has a pH of 6.5 to 7.0. Water is then added to make 100 parts of the combined product.

Combination product B

| | Parts by weight |
|---|---|
| Intermediate product #3 | 40 |
| Intermediate product #6 | 10 |

Acetic acid is added to this mixture so that an aqueous solution has a pH range of 6.0 to 7.0. Water is then added to make 100 parts of the combined product.

Combination product C

| | Parts by weight |
|---|---|
| Intermediate product #1 | 20 |
| Intermediate product #7 | 15 |

Formic acid is added to give the mixture a pH of 6.5 to 7.0 and the mixture is made up with water to 100 parts.

Combination product D

| | Parts by weight |
|---|---|
| Intermediate product #3 | 35 |
| Intermediate product #8 | 5 |

Formic or acetic acid is added as above, followed by water.

In connection with the above combination products A to D, the heating period is from 15 minutes to 2 hours at 100° C. to 150° C. It is not clear what combination is formed between the esterified polyethylene glycol and the fatty acid condensation product of the polyalkylene polyamine or alkanolamine, but the combination does not act like a simple mixture since it has definite synergistic properties.

DYEING PROCEDURES

The following examples illustrate the use of the above described compounds in connection with dyeing wool with chromiferous dyes. In each case the dye bath was prepared using the dye and dye bath assistant composition using 7% sulfuric acid. The wool was introduced at 120° F., the bath brought to boil and boiled for 45 minutes.

Example I

| | Percentages by weight |
|---|---|
| A chromiferous dye known as Neolan Blue G G (prototype #144) | 1 |
| Combination product A | 1 |

Example II

| | Percentages by weight |
|---|---|
| A chromiferous dye known as Neolan Bordeaux (prototype #145) | 0.5 |
| Combination product C | 1 |

Example III

| | Per cent |
|---|---|
| A chromiferous dye known as Neolan Orange R (prototype #146) | 0.25 |
| Combination product B | 1 |

Dyestuffs other than the metalliferous or chromiferous types may be employed as follows:

Example IV

A chrome color known as Erio Chrome Orange R (no Color Index number) was used. The dye bath was prepared with 10% sodium sulphate, 2% acetic acid, 0.25% of the dyestuff, and 1% of the combination product B. The wool was introduced at 120° F. and the bath boiled. Then, additional acetic acid was added, the boiling was continued, sodium di-chromate was added and the boiling again continued.

Example V

An acid color known as Erio Fast Cyanine Green G (Color Index #1078) was used. The dye bath was prepared with 10% sodium sulphate, 1% acetic acid, 0.25% of the dye, and 1% of the combination product A. The wool was introduced at a temperature of 120° F., the bath then brought to boil, the boiling continued for 15 minutes. Then additional acetic acid was added and the bath again boiled.

The Erio chrome dyes do not contain chromium, but acid dyes requiring mordant. The chromium is not present in the dye, but is used in the bath or the wool may be chromed before or after dyeing. The following additional example discloses a dye containing chromium.

Similar examples were run without using the dyeing assistant compositions of the present invention and in all cases uneven and unsatisfactory dyeing effects resulted.

By using the compositions described in detail above, it is not only possible to obtain a quicker and more satisfactory dyeing procedure, but also a more even dyeing effect. Also, a more efficient utilization of the dye is accomplished and the appearance and quality of the tippy wool fibres dyed by this process are enhanced.

For example, without these dyeing assistants of the present invention, it is necessary when using metalliferous dyes to boil materials for about 2 hours with 8 to 12% sulfuric acid. Whereas, according to the present invention, it is sufficient to boil such material with 5 to 7% of sulfuric acid for only 30 to 45 minutes. It is thus possible to reduce the processing time to a fraction of that ordinarily used, and at the same time, to produce an improved dyeing effect. Also, by this method, loss of tensile strength is minimized and felting is reduced considerably.

In studying the action of these dyeing assistant compositions in the bath, it appears that the amino fatty condensation constituent acts as a cationic leveling agent which tends to force the dye upon the goods or fibre probably by reason of a semi-stable compound which is formed with the dye. The polyethylene glycol fatty ester of this combination is non-ionic in character and acts both as a retardant and as a wetting agent, and there appears to be a balance during the dyeing operation, whereby the esterified component tends to retard the dyestuff from going on the product and the amino condensation product tending to force it upon the fibre. During the latter part of the dyeing operation, the tendency to force the dye on the fibre becomes predominant with the result that good exhaustion of the bath is obtained.

Without the combination products of the present invention, the dyeing not only is not level but also the fibers are disadvantageously affected by the prolonged processing at elevated temperature and high concentration of acid.

As many changes could be made in the above dyeing procedures and assistants useful therein and many widely different embodiments of this invention could be made without departing from the scope of the claims, it is intended that all matter contained in the above description shall be interpreted as illustrative and not in a limiting sense.

What is claimed is:

1. A tippy wool dyeing assistant comprising a synergistic combination produced by heating together at about 100° C. to 150° C. for fifteen minutes to two hours a high molecular weight fatty acid ester of polyethylene glycol, said ester having about one to two mols of fatty acid per mol of polyethylene glycol and said polyethylene glycol having a molecular weight of about 400 to 6,000, and a condensation product of a water soluble aliphatic amine having 2 to 18 carbon atoms and a fatty acid having 10 to 32 carbon atoms, said condensation product being produced by heating together one mol of amine with between 1 to 2 mols of the fatty acid at about 180° C. to 220° C. for about one to four hours until the free fatty acid content of the mixture is reduced to not more than 1%, said assistant being composed of about 20 to 50 parts by weight of the polyethylene glycol ester and 5 to 20 parts by weight of the condensation product, and said assistant having a pH of between about 6 to 7.

2. A tippy wool dyeing assistant comprising a synergistic combination produced by heating together at about 100° C. to 150° C. for fifteen minutes to two hours a high molecular weight fatty acid ester of polyethylene glycol, said polyethylene glycol having a molecular weight of about 400 to 6,000 and a condensation product of a water soluble aliphatic amine having 2 to 18 carbon atoms and a fatty acid having 10 to 32 carbon atoms, the fatty acid and polyethylene glycol being in substantially two to one molal ratio in the polyethylene glycol ester, said condensation product being produced by heating together one mol of amine with between 1 to 2 mols of the fatty acid at about 180° C. to 220° C. for about one to four hours until the free fatty acid content of the mixture is reduced to not more than 1%, said assistant being composed of about 20 to 50 parts by weight of the polyethylene glycol ester and 5 to 20 parts by weight of the condensation product, and said assistant having a pH of between about 6 to 7.

3. A tippy wool dyeing assistant comprising a synergistic combination produced by heating together at about 100° C. to 150° C. for fifteen minutes to two hours a palmitic acid ester of a polyethylene glycol having a molecular weight of about 1,500, said ester having about one to two mols of fatty acid per mol of polyethylene glycol and a condensation product of a water soluble aliphatic amine having 2 to 18 carbon atoms and a fatty acid having 10 to 32 carbon atoms, said assistant being composed of about 20 to 50 parts by weight of the polyethylene glycol ester and 5 to 20 parts by weight of condensation product and said combination being further combined with a water soluble organic acid to give a pH in the range of about 6 to 7, and said condensation product being produced by heating together one mol of amine with between 1 to 2 mols of the fatty acid at about 180° C. to 220° C. for about one to four hours until the free fatty acid content of the mixture is reduced to not more than 1%.

4. A tippy wool dyeing assistant comprising a synergistic combination produced by heating together at about 100° C. to 150° C. for fifteen minutes to two hours a combination of a high molecular weight fatty acid ester of polyethylene glycol, said ester having about one to two mols of fatty acid per mol of polyethylene glycol and said polyethylene glycol having a molecular weight of about 400 to 6,000 and a condensation product of aminoethylethanolamine and coconut oil fatty acids, said assistant being composed of about 20 to 50 parts by weight of the polyethylene glycol ester and 5 to 20 parts by weight of condensation product and said combination being further combined with a water soluble organic acid to give a pH in the range of about 6 to 7, said condensation product being produced by heating together one mol of amine with between 1 to 2 mols of the fatty acid at about 180° C. to 220° C. for about one to four hours until the free fatty acid content of the mixture is reduced to not more than 1% and said combination being further combined with a water soluble organic acid to give a pH in the range of about 5 to 7.

5. A tippy wool dyeing assistant comprising a synergistic combination produced by heating together at about 100°C. to 150°C. for fifteen minutes to two hours, a combination of a high molecular weight fatty acid ester of polyethylene glycol, said ester having about one to two moles of fatty acid per mol of polyethylene glycol and said polyethylene glycol having a molecular weight of about 400 to 6,000, and a condensation product of tetraethylene pentamine and stearic acid, said assistant being composed of about 20 to 50 parts by weight of the polyethylene glycol ester and 5 to 20 parts by weight of condensation product and said combination being further combined with a water soluble organic acid to give a pH in the range of about 6 to 7, and said condensation product being produced by heating together one mol of amine with between 1 to 2 mols of the fatty acid at about 180° C. to 220° C. for about one to four hours until the free fatty acid content of the mixture is reduced to not more than 1% and said combination being further combined with a water soluble organic acid to give a pH in the range of about 5 to 7.

6. A tippy wool dyeing assistant comprising a synergistic combination produced by heating together at about 100° C. to 150° C. for fifteen minutes to two hours a polyethylene glycol, a high molecular weight fatty acid ester of polyethylene glycol, said ester having about one to two mols of fatty acid per mol of polyethylene glycol and said polyethylene glycol having a molecular weight of about 400 to 6,000, and a condensation product of a water soluble aliphatic amine having 2 to 18 carbon atoms and a fatty acid having 10 to 32 carbon atoms, said assistant being composed of about 20 to 50 parts by weight of the polyethylene glycol ester and 5 to 20 parts by weight of condensation product and said combination being further combined with formic acid to give a pH in the range of about 6 to 7, and said condensation product being produced by heating together one mol of amine with between 1 to 2 mols of the fatty acid at about 180° C. to 220° C. for about one to four hours until the free fatty acid content of the mixture is reduced to not more than 1%.

ALTON A. COOK.
IRA SAPERS.

REFERENCES CITED

The following references are of record in the file of this patent:

UNITED STATES PATENTS

| Number | Name | Date |
|---|---|---|
| 2,040,796 | Rittinghausen | May 12, 1936 |
| 2,228,369 | Schoeller | Jan. 14, 1941 |

FOREIGN PATENTS

| Number | Country | Date |
|---|---|---|
| 526,760 | Great Britain | Sept. 25, 1940 |